(12) United States Patent
Samain et al.

(10) Patent No.: US 10,207,287 B2
(45) Date of Patent: Feb. 19, 2019

(54) MACHINE AND TREATMENT PROCESS VIA CHROMATOGENOUS GRAFTING OF A HYDROXYLATED SUBSTRATE

(75) Inventors: Daniel Samain, Meylan (FR); David Guerin, Chamaliere (FR); André Lemaitre, Grenoble (FR); Laurent Lyannaz, Saint Egreve (FR); Jean-Luc Guillouty, Gieres (FR)

(73) Assignees: CENTRE NATIONAL DE LA RECHERCHE SCIENTIFIQUE (CNRS), Paris (FR); CENTRE TECHNIQUE DU PAPIER, Gieres (FR)

( * ) Notice: Subject to any disclaimer, the term of this patent is extended or adjusted under 35 U.S.C. 154(b) by 0 days.

(21) Appl. No.: 13/885,262

(22) PCT Filed: Nov. 16, 2011

(86) PCT No.: PCT/EP2011/070202
§ 371 (c)(1),
(2), (4) Date: May 14, 2013

(87) PCT Pub. No.: WO2012/066015
PCT Pub. Date: May 24, 2012

(65) Prior Publication Data
US 2013/0236647 A1 Sep. 12, 2013

(30) Foreign Application Priority Data

Nov. 16, 2010 (FR) ..................... 10 59418

(51) Int. Cl.
*B05D 3/00* (2006.01)
*B05C 9/12* (2006.01)
(Continued)

(52) U.S. Cl.
CPC ............... *B05C 9/12* (2013.01); *B05D 3/007* (2013.01); *C08J 7/14* (2013.01); *D21H 17/06* (2013.01);
(Continued)

(58) Field of Classification Search
CPC .......... B05C 9/12; B05D 3/007; D21H 25/02; D21H 25/04
See application file for complete search history.

(56) References Cited

U.S. PATENT DOCUMENTS 4,017,982 A * 4/1977 Goffredo ..................... 34/464
4,477,287 A * 10/1984 Kush ................. B08B 5/026
134/15

(Continued)

FOREIGN PATENT DOCUMENTS

| WO | WO 98/14661 A1 | 4/1998 |
| WO | WO 99/08784 A1 | 2/1999 |
| WO | WO 2009/083525 A1 | 7/2009 |

OTHER PUBLICATIONS

Berlioz et al., "SFGP 2007—Investigation of a Novel Principle of Chemical Grafting for Modification of Cellulose Fibers", International Journal of Chemical Reactor Engineering, 2008, vol. 6, Article A2, 17 pages.

(Continued)

*Primary Examiner* — Alexander M Weddle
(74) *Attorney, Agent, or Firm* — Birch, Stewart, Kolasch & Birch, LLP (57) ABSTRACT

The invention relates to a machine for chromatogenous grafting treatment of a scrolling substrate (S) having a hydroxylated face (Fh), comprising:
- an application device (3) of a grafting reagent on the hydroxylated face (Fh) of the substrate,
- a heating roller (4) for the development of the grafting reaction on the hydroxylated face (Fh) of the substrate, (Continued)

said roller (4) being provided with a bar-end system (5*a*, 5*b*) for applying a face of the substrate (S) against said heating roller (4), an extraction device (6) of the hydrochloric acid produced during the grafting reaction, an application device (7) of an air knife on the treated face of the substrate for eliminating the residual grafting reagent.

The invention also relates to a chromatogenous grafting process used in said machine.

19 Claims, 3 Drawing Sheets

(51) Int. Cl.
    *C08J 7/14*     (2006.01)
    *D21H 17/06*     (2006.01)
    *D21H 17/11*     (2006.01)
    *D21H 17/14*     (2006.01)
    *D21H 21/16*     (2006.01)
    *D21H 25/02*     (2006.01)
    *D21H 25/04*     (2006.01)

(52) U.S. Cl.
    CPC ............. *D21H 17/11* (2013.01); *D21H 17/14* (2013.01); *D21H 21/16* (2013.01); *D21H 25/02* (2013.01); *D21H 25/04* (2013.01); *C08J 2301/02* (2013.01)

(56) References Cited

U.S. PATENT DOCUMENTS

| | | | | |
|---|---|---|---|---|
| 4,917,717 | A | * | 4/1990 | Thomas et al. ................ 65/60.1 |
| 6,342,268 | B1 | * | 1/2002 | Samain ................... C03C 17/30 106/13 |
| 2008/0244925 | A1 | * | 10/2008 | Shin ................................ 34/611 |
| 2009/0016785 | A1 | * | 1/2009 | Haan et al. ................... 399/301 |
| 2010/0015425 | A1 | * | 1/2010 | Bindschedler et al. ...... 428/219 |
| 2010/0273382 | A1 | * | 10/2010 | Nandi et al. .................... 442/76 |
| 2011/0014458 | A1 | | 1/2011 | Stinga et al. |

OTHER PUBLICATIONS

De Paola et al., "Industrial Development of BioGuard, a New Paper Internal Sizing and Waterproofing Process", Specialty and Technical paper proceedings, Berlin, Jun. 20-21, 2000, 6 pages.

International Search Report, dated Feb. 15, 2012, for International Application No. PCT/EP2011/070202.

Preliminary Search Report, dated Jun. 24, 2011, for French Application No. 1059418.

Samain et al., "Bioguard, a practical application of chromatogenic chemistry", Specialty and Technical Paper, Toronto, Jun. 7-9, 1999, 8 pages.

Stinga, "The use of chromatogenic chemistry for the conception and realization of cellulosic materials with long chain fatty acids", Universite Joseph Fourier—Grenoble 1, Feb. 2, 2010, XP0026443401, 242 pages with abstract (thesis).

* cited by examiner

MACHINE AND TREATMENT PROCESS VIA CHROMATOGENOUS GRAFTING OF A HYDROXYLATED SUBSTRATE

FIELD OF THE INVENTION

The present invention relates to a machine for treatment via chromatogenous grafting of a hydroxylated substrate, and a process carried out by means of said machine.

BACKGROUND OF THE INVENTION

Processes for forming films having barrier properties vis-à-vis water, grease, gases and/or water vapour have already been proposed.

Such films are particularly preferred in the field of packaging for example, and especially food packaging.

In particular, document WO 99/08784 proposes grafting hydrophobic groups on a support having hydrophilic functions.

The document WO 2009/083525 proposes more specifically grafting a fatty acid onto a film of polyvinyl alcohol (PVA), making it hydrophobic. Said PVA film can be attached to a substrate to be made watertight.

These two documents propose employing grafting by chromatogenic chemistry.

Contrary to so-called "classic" chemistry, where the reaction must be made in a solvent capable of putting the surface of the substrate and the reagent in contact and trapping the released hydrochloric acid, chromatogenic chemistry utilises the vapour pressure of the reagents and a gas flow to diffuse the reagent inside the substrate, dispensing with solvents.

A particularly interesting chromatogenous grafting reaction typically comprises having a hydroxylated substrate S react with a long-chain fatty acid chloride and can be written as per the formula:

where K1 and K2 are respectively the constants of association and dissociation rate.

Currently, this grafting process has been used in laboratories only.

However, chromatogenic chemistry has advantages in terms of process, such that it is now preferable to design a continuous treatment process, that is, which can be used on a substrate driven to scroll between rollers.

In fact, in chromatogenic chemistry, there is no need for solvent to make contact between the substrate to be treated and the reagent—therefore no need to use rinsing for eliminating excess reagent.

Also, the gas flow employed in the reaction at the same time eliminates the released HCl (which avoids having to trap it) and the excess reagents.

Also, it has been demonstrated in the above-mentioned publications that a satisfactory barrier effect was obtained with a low grafting rate, which allows employing low quantities of reagents.

However, for this treatment to be compatible with industrial application, it is necessary to resolve a certain number of problems.

First, it is necessary to have a controlled quantity of reagent at the surface of the substrate to be treated.

The necessary quantity depends on the nature of the substrate, but varies within a range of 0.01 to 10 g/m² and more precisely in a range of 0.1 to 2 g/m².

As the reaction uses no solvent, this deposit has to be made in pure product.

Second, it is necessary to reduce the reaction time as much as possible.

In fact, with a scrolling speed of 600 meters/minute, a reaction rate corresponding to a reaction time of one second results in a development reactor of 10 meters.

It is therefore necessary to define reaction parameters which boost the reaction rate.

Another problem to resolve for industrial use is that the release of hydrochloric acid during the reaction is harmful to the kinetics and, because of the corrosive character of this gas, is also likely to damage the substrate.

It is therefore necessary to be able to correctly eliminate the released HCl.

Another problem is to eliminate the residual reagent which has not reacted with the substrate, after grafting.

In fact, if reagent remains in contact with the substrate once the latter is wound, a grafting reaction which release HCl continues to be produced which, being trapped between two substrate thicknesses, risks damaging the latter.

An aim of the present invention is therefore to design a machine which enables grafting by chromatogeny on an industrial scale.

Another aim of the invention is to optimise the treatment process so it is viable on the economic and industrial plane.

BRIEF DESCRIPTION OF THE INVENTION

According to the invention, a machine for chromatogenous grafting treatment of a scrolling substrate having a hydroxylated face is proposed, comprising:
- a winder for unwinding the substrate,
- an application device of a grafting reagent on the hydroxylated face of the substrate,
- a heating roller for the development of the grafting reaction on the hydroxylated face of the substrate, said roller being provided with a bar-end system for applying a face of the substrate against said heating roller,
- an extraction device of the hydrochloric acid produced during the grafting reaction,
- an application device of an air knife on the treated face of the substrate for eliminating the residual grafting reagent,
- a rewinding device of the treated substrate.

According to a first embodiment of said machine, the bar-end system is arranged so as to apply the hydroxylated face of the substrate against said heating roller.

According to a particularly advantageous embodiment of said machine, it comprises at least two successive heating rollers and respective bar-end systems for applying the hydroxylated face of the substrate against said heating rollers for the development of the grafting reaction.

According to a particular embodiment of the invention, especially in the case where the substrate is not porous, the surface of the heating roller is provided with roughness to produce an airgap between the roller and the substrate.

The application device of the air knife is preferably a nozzle inclined at an angle greater than 30° relative to the surface of the substrate and oriented counter-current to the direction of travel of the substrate.

According to a second embodiment, said machine comprises a fairing device comprising said heating roller, the bar-end system being arranged so as to apply the face of the substrate opposite the hydroxylated face against said heating roller.

The application device of the air space is advantageously arranged at the outlet of the fairing device so that the air space sweeps the hydroxylated face of the substrate countercurrent to the direction of travel of the substrate when the substrate is against the heating roller.

Also, the extraction device is preferably arranged at the inlet of the fairing device so as to aspirate the products transported by said air knife.

The application device of the grafting reagent is preferably a flexography or heliography device, or a deposit device by etched or rough cylinder.

Another object of the invention relates to a process for treatment by chromatogenous grafting of a scrolling substrate having a hydroxylated face, comprising the following steps:
  (a) application, on the hydroxylated face of the substrate, of a grafting reagent,
  (b) development of the grafting reaction, one face of the substrate being applied against a heating roller,
  (c) extraction of the hydrochloric acid emitted during the grafting reaction when the substrate leaves the contact of the heating roller,
  (d) application of a hot air knife on the treated face of the substrate so as to evacuate the residual grafting reagent,
and in that the diameter, temperature and rotation speed of the heating roller are selected such that the duration of contact of the substrate with the heating roller is substantially equal to the duration of the grafting reaction.

According to a first embodiment of said process, especially when the substrate has high porosity or a low humidity rate, the hydroxylated face of the substrate is applied, for the development of the grafting reaction, against the heating roller with an airgap adapted to confine the grafting reagent between the roller and the substrate and to allow dissipation of hydrochloric acid emitted during the grafting reaction.

The hydrochloric acid is preferably extracted when the substrate leaves the contact of the heating roller.

In a particularly advantageous manner, the development step (b) of the reaction is conducted by application of the hydroxylated face of the substrate against at least two successive rollers and the extraction step of the hydrochloric acid is conducted when the substrate leaves the contact of each of said rollers.

The porosity and/or the roughness of the substrate and/or the roughness of the surface of the heating roller are advantageously selected so as to obtain between the substrate and the heating roller an airgap adapted to contain the hydrochloric acid emitted by the chromatogenous reaction.

So, said airgap is on average between 0 and 100 μm, a zero airgap corresponding typically to the case of a porous substrate (the substrate absorbing all the released hydrochloric acid), whereas a larger airgap is selected when the substrate is not porous (the volume necessary for release of the hydrochloric acid being obtained by the roughness of the heating roller).

According to a second embodiment of the process, especially when the substrate is thick, not very porous, or having a strong humidity rate, for the development of the grafting reaction, the face opposite the hydroxylated face of the substrate is applied against the heating roller.

In a particularly advantageous manner, the hot air knife is applied simultaneously to the grafting reaction so as to sweep the treated face of the substrate counter-current to the direction of travel of the substrate.

The hydrochloric acid and the residual grafting reagent are preferably extracted upstream of the heating roller relative to the direction of travel of the substrate.

The temperature of the hot air knife is generally greater than the temperature of the hydroxylated face of the substrate during the grafting reaction.

The application step (a) of the reagent on the hydroxylated face of the substrate is conducted preferably by flexography or by heliography.

According to a preferred application of the invention, the substrate is cellulosic material one face of which is coated with a film of polyvinyl alcohol, and the grafting reagent comprises stearic acid chloride or palmitic acid chloride.

It is optionally possible to combine the two embodiments of the process by employing at least two heating rollers and by applying, against at least one heating roller, the hydroxylated face of the substrate and by applying, against at least one other heating roller, the face opposite the hydroxylated face of the substrate against said heating roller.

BRIEF DESCRIPTION OF THE DRAWINGS

Other characteristics and advantages of the invention will emerge from the following detailed description, in reference to the attached drawings, in which.

It should be noted that, for clarity of illustration, the different devices shown in these figures are not representative of the real scale of the machine.

DETAILED DESCRIPTION OF THE INVENTION

The grafting process generally applies to a hydroxylated substrate S in the form of a roll having a determined width depending on the intended application.

The substrate S is typically a porous substrate, one face of which has hydrophilic functions (as described in document WO 99/08784), which are either borne by the substrate itself or by a coating of a layer having hydrophilic functions.

According to a particular embodiment of the invention, the substrate S has a face coated with a film of polyvinyl alcohol (PVA), as described in document WO 2009/083525.

Reference will be made especially to these documents for more details on preparation of the hydroxylated substrate, which is not the object of the present invention.

According to a preferred application of the invention, the substrate S is cellulosic material such as paper or cardboard.

Reminder About the Chromatogenous Reaction

The grafting reagent is characterised by a boiling temperature $T_{eb}$.

The grafting reagent is diffused in a porous substrate under the action of gas flow of rate D and temperature $T_0$ less than $T_{eb}$.

The Clausius-Clapeyron equation calculates the volume of gas Vr necessary for fully eluting the reagent from the porous substrate:

$$LnVr = d + cT_{eb}/T_0 \text{ (}c \text{ and } d \text{ being constant)}$$

This volume of gas is associated with the reaction time Tr by the relation Vr=D·Tr, hence:

$$LnTr = d + cT_{eb}/T_0 - \log D$$

Given that the reactions are of order 1, the differential kinetics equation C of the equation is:

$$C = K1\{SOH\}\cdot\{ROCl\} - K2\{SOR\}\{HCl\}$$

If hydrochloric acid is eliminated continuously, the second term of the equation is zero and the kinetics C depends on the first term only.

The Arrhenius law also states that the speed constant C is an exponential function of the temperature, which is:

$$K1 = Ae - Ea/RT_0$$

where Ea is the activation energy of the reaction and R the constant of perfect gases.

Ln C can therefore be:

$$LnC = \text{Log}\,\{SOH\}\cdot\{ROCl\} + \text{Log}\,A - Ea/RT_0$$

It is possible to define an average kinetics value Cm which is:

$$LnCm = f - Ea/RT_0$$

The yield R of the reaction can be the ratio between the degree of advancement of the reaction (which is the product of speed by time) and the initial quantity $Q_0$ of reagent deposited:

$$R = Cm \cdot Tr/Q_0$$

or:

$$LnR = LnCm + LnTr - LnQ_0$$

Replacing Cm and Tr by their expressions defined hereinabove gives:

$$LnR = f - Ea/RT_0 + d + cT_{eb}/T_0 - LnQ_0 - LnD$$

which can be:

$$LnR = a - Ea/RT_0 + cT_{eb}/T_0 - LnD$$

where $a = f + d - \text{Ln}\,Q_0$
The yield is therefore:

$$R = \frac{e^{a - Ea/RT_0 + cT_{eb}/T_0}}{D}$$

This formula therefore shows the influence on this yield of the boiling temperature $T_{eb}$ of the reagent, the temperature $T_0$ of the reaction, and the rate D of the gas.

This influence has also been shown experimentally, as in the articles by E. de Paola, J-S. Condoret and D. Samain, *Industrial Development of BioGuard, a New Paper Internal Sizing and Waterproofing Process*, Specialty and Technical Paper Proceedings, Berlin, 20-21 Jun. 2000 and by S. Berlioz, C. Sting a, J. Condoret and D. Samain, *Investigation of a Novel Principle of Chemical Grafting for Modification of Cellulose Fibers*, International Journal of Chemical Reactor Engineering, Vol. 6, 2008.

For each reagent there is therefore an optimum of the reaction temperature, beyond which a significant drop in yield is noticed.

This drop in yield is not due a drop in reactivity but to the fact that part of the reagent is lost by diffusion.

When the temperature rises, the influence of this reagent loss becomes greater than the increase in rectional speed caused by temperature.

The rate also has considerable influence on the diffusion of the reagent.

It is therefore clear that a mere rise in the reaction temperature does not accomplish the preferred aim of reducing reaction time, since it results in loss of reagent by diffusion.

The machine developed according to the invention, and the associated process, limit diffusion of the reagent while reaching the reaction temperature as fast as possible.

This machine and this process are described successively hereinbelow.

Treatment Machine

Figure 1:
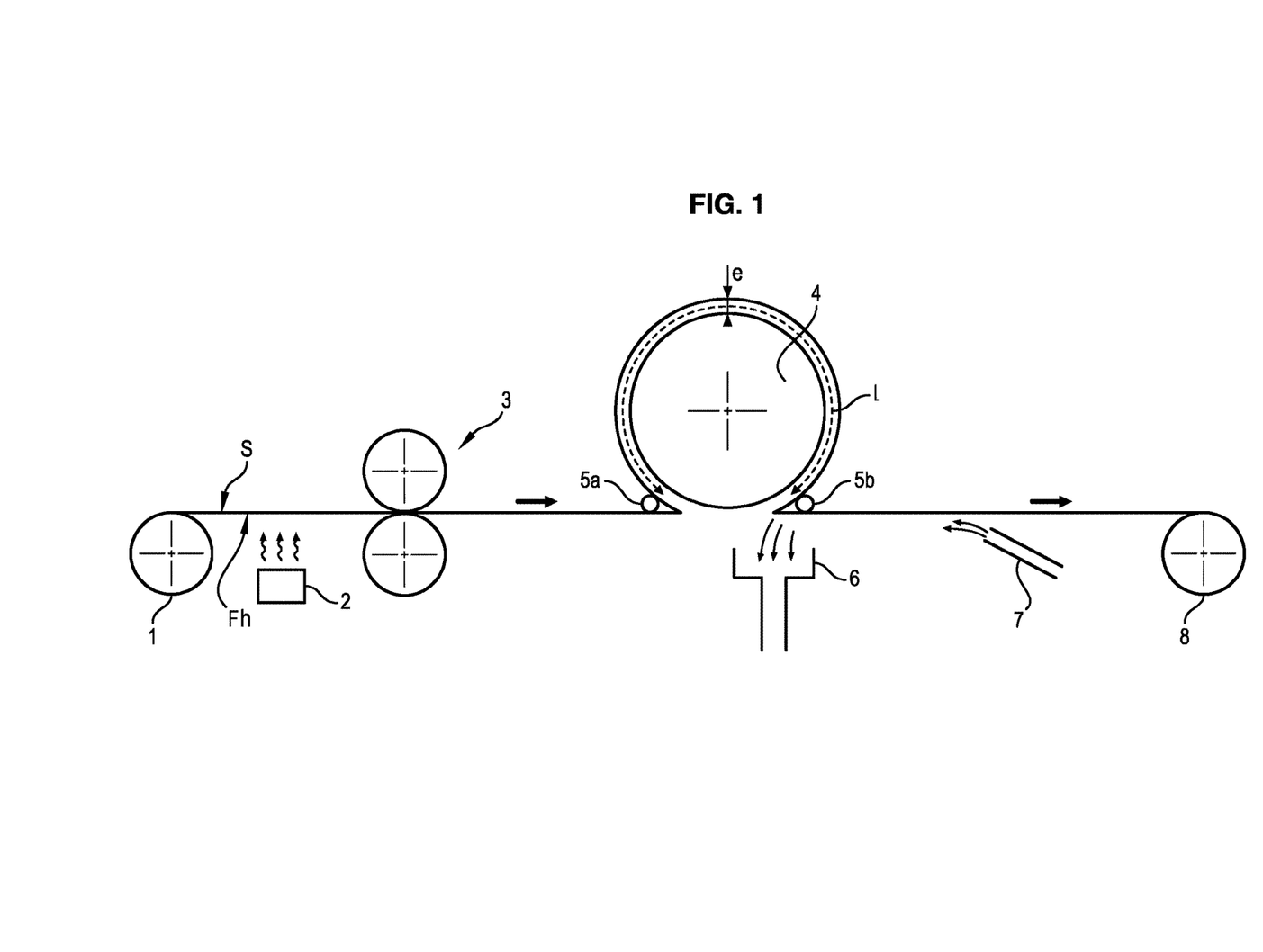
FIG. 1 is a schematic view of the structure of an embodiment of a machine according to the invention.

In reference to FIG. 1, a first embodiment of the machine is described initially, from upstream to downstream of the process.

The machine comprises in its upstream part a winder 1 adapted to receive a roll of substrate S, one face of which Fh is hydroxylated.

A device 3 for deposit of the grafting reagent is situated downstream of the winder 1.

This is advantageously a flexography or heliography device, known to the person skilled in the art, which deposits the grafting reagent in the liquid state onto the hydroxylated face Fh of the substrate, as for ink.

It is possible to precisely control the density and quantity of the grafting reagent deposited using particular etching of the anilox roller which is used for applying the reagent.

A heating element 2 of the substrate is optionally present between the winder 1 and the device 3.

This heating element 2 can comprise infrared heating means, for example.

It can be useful for drying the substrate before reaction, and/or for bringing the temperature of the substrate to a temperature similar to that of the grafting reagent.

By way of option, a heating element can also be placed downstream of the application device 3 of the reagent to prevent the substrate and the reagent from cooling before the onset of development of the reaction.

The machine also comprises a heating roller 4 whereof the diameter, temperature, and rotation speed are selected such that the duration of contact of the substrate against the roller corresponds substantially to the duration of the reaction.

A bar-end system 5a, 5b connected to the roller forces the hydroxylated face of the substrate to be pressed against the roller, over the greatest length possible. In fact, as will be evident hereinbelow, it is when in contact with the heating roller that the grafting reaction develops.

Just downstream of the heating roller 4, that is, at the site where the substrate S leaves the contact of the roller 4, a gas extraction device 6 is arranged.

This device 6 is for example an extractor hood, which eliminates the HCl emitted during the grafting reaction near the substrate (the HCl being harmful to the reaction kinetics and likely to damage the substrate) and prevents it from dispersing in the environment of the machine.

Downstream of the heating roller 4, the machine comprises an application device 7 of an air knife for eliminating the residual grafting reagent.

This device 7 typically comprises a nozzle oriented towards the treated face of the substrate, with an appropriate inclination for diffusing a hot air knife which sweeps the substrate and disperses the residual reagent.

The nozzle has a width substantially equal to the width of the substrate, so as to sweep the entire width of the latter.

For example, the nozzle is inclined at an angle of around 45° relative to the face of the substrate.

The direction of the air knife is preferably opposite the direction of travel of the substrate to optimise dispersion of the reagent.

In the region of application of the hot air knife, it is ensured that the substrate rests on a rigid support so as not to deform under the action of the air knife.

Said rigid support can be for example a plane surface (not illustrated here) against which the face opposite the hydroxylated face of the substrate scrolls.

The machine optionally comprises a cooling device of the substrate for bringing the latter to a temperature of around under 55° C. in view of its winding.

Finally, the machine comprises in its downstream part a rewinding device 8 of the treated substrate.

Such devices are within the range of the person skilled in the art and will therefore not be described in further detail.

Also, the machine comprises means (not shown) for tensing the substrate between the winder and the rewinding device to ensure contact of the hydroxylated face of the substrate with the heating roller, as will be described hereinbelow.

Figure 2:
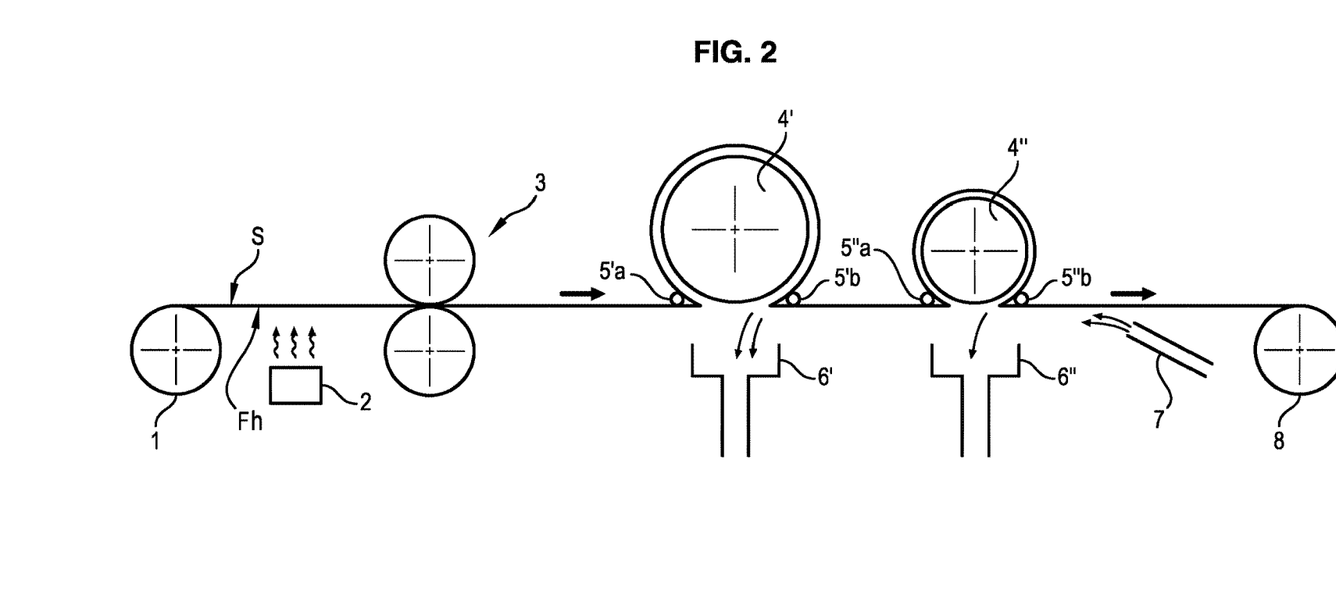
FIG. 2 is a schematic view of a variant of said machine

FIG. 2 illustrates a variant of the machine, in which the development reactor of the grafting reaction comprises not a single heating roller but two successive heating rollers 4' and 4".

A bar-end system respectively 5a', 5b' and 5a", 5b" is coupled to each heating roller 4', 4" to force the substrate to press against each of the rollers.

The heating rollers 4', 4" can be identical but it could be advantageous to give them a different diameter and temperature so as to more precisely control the reaction.

Naturally, the machine could also comprise more than two heating rollers, the person skilled in the art being able to define the parameters of said heating rollers to optimise the grafting reaction, as will be seen hereinbelow.

As can be seen from FIG. 2, at the outlet of each reaction volume, that is, at the place where the substrate leaves the contact of the heating roller 4', 4" an aspiration device 6', 6" similar to the device 6 described earlier is placed.

The rest of the machine is identical to the machine of FIG. 1.

Figure 3:
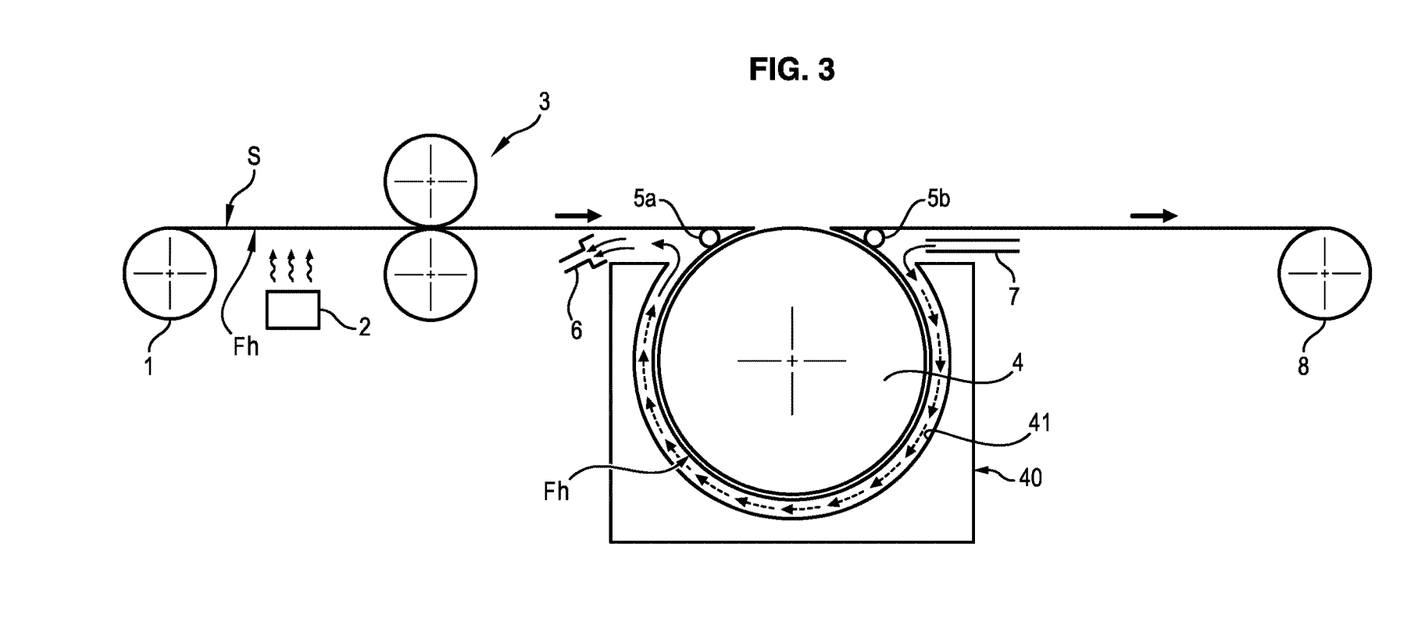
FIG. 3 is a schematic view of another embodiment of a machine according to the invention.

FIG. 3 illustrates another embodiment of the machine.

In this embodiment, as in the one described hereinabove, the machine comprises a heating roller 4 to which is connected a bar-end system 5a, 5b for forcing the substrate to press against the roller 4.

The development reactor of the chromatogenous reaction is a fairing device 40 comprising the roller 4, such that the substrate passes between the heating roller 4 and a concave cylindrical surface 41 whereof the axis of symmetry is coincident with the axis of the roller 4.

The airgap between the roller 4 and the concave surface 41 can be between 100 μm and 20 cm.

Unlike the previous embodiment, it is the face opposite the hydroxylated face Fh which is in contact with the heating roller 4.

The heating roller 4 has a diameter, temperature and rotation speed selected such that the duration of contact of the substrate against the roller corresponds substantially to the duration of the reaction.

The application device 7 of an air knife in this embodiment is arranged so as to diffuse a hot air knife which sweeps the treated face Fh of the substrate while the opposite face is in contact with the heating roller 4.

This device 7 typically comprises a nozzle oriented towards the interior of the fairing device 40, that is, between the roller 4 and the concave surface 41, in the direction opposite the direction of travel.

The nozzle preferably has a width substantially equal to the width of the substrate, so as to sweep the entire width of the latter.

The machine further comprises an aspiration device 6 to aspirate the hydrochloric acid and the water formed during reaction.

In a particularly advantageous manner, said aspiration device 6 is placed upstream of the fairing device 40 and oriented towards the interior of the latter so as to gather reagent residue and water and hydrochloric acid carried along via the hot air knife.

The rest of the machine is identical to the machine of FIG. 1.

Also, it is possible, as in FIG. 2, to successively place several heating rollers to optimise the grafting reaction.

Rollers can of course be alternated where the hydroxylated face is in contact with the roller and rollers where the hydroxylated face is opposite the roller.

Chromatogenous Grafting Process

The chromatogenous grafting process, still in reference to FIGS. 1 and 2, will now be described.

The direction of travel of the substrate S is shown by a double arrow in FIGS. 1 and 2.

The substrate S, one face of which Fh is hydroxylated, is in the form of a roll which is placed on the winder 1.

A sufficient length of the substrate is moved to the rewinding device 8 and the substrate S is tensed between these two devices.

In the example illustrated in FIG. 1, the hydroxylated face Fh is oriented downwards, but it is understood that the process with the hydroxylated face Fh oriented upwards could be used by consequently adapting the arrangement of the components of the machine which will be described hereinbelow.

Optionally, the substrate S upstream of the deposit of the grafting reagent is lightly heated to dry it and/or bring it substantially to the same temperature as the reagent.

This preliminary heating is done by the heating element 2 mentioned earlier.

The grafting reagent is deposited onto the hydroxylated face Fh of the substrate by the device 3.

The grafting reagent is utilised pure, in liquid form; in the device 3 it is therefore brought to a temperature greater than its melting temperature to present viscosity compatible with the deposit system (a higher temperature by 20 to 30° C. relative to the melting temperature of the reagent is considered appropriate).

According to a preferred embodiment of the invention, the grafting reagent is a fatty acid chloride such as described in document WO 99/08784 cited above.

In a particularly advantageous manner, and especially in the case where the substrate is covered by a film of PVA, the grafting reagent is stearic acid chloride or palmitic acid chloride.

The reagent is not deposited evenly (which would correspond to a flat area where the reagent would uniformly cover the entire surface of the substrate), but heterogeneously, that is, in the form of a plurality of discrete spots distributed evenly over the surface of the substrate.

It has actually been shown in the article by S. Berlioz, C. Sting a, J. Condoret and D. Samain, *Investigation of a Novel Principle of Chemical Grafting for Modification of Cellulose Fibers*, International Journal of Chemical Reactor Engineering, Vol. 6, 2008, that during development of the reaction diffusion of the reagent takes place in the plane of the substrate, resulting in a uniformly hydrophobic surface about each deposited spot.

The development of the reaction is implemented by applying the hydroxylated face Fh of the substrate against the heating roller 4, and maintaining a thin airgap e between the surface of the roller and that of the substrate.

It should be understood that in FIGS. 1 and 2 this airgap e has been exaggerated to allow it to be shown.

In reality, the airgap e is dimensioned so as to enable both confinement of the reagent near the substrate (to limit reagent losses) and also a volume allowing the product produced by the reaction to dissipate).

The necessary airgap can be calculated according to the following reasoning, based on the hypothesis of grafting with a quantity of 0.5 g/m$^2$ of stearic acid chloride.

The number of moles of HCl released is at most 0.5/302.4 or $1.66 \cdot 10^{-3}$ mole (the molecular weight of the stearic acid being 302.4 g/mol).

The corresponding volume is $1.66 \cdot 10^{-3} \times 22.4$ l or 37 ml.

At atmospheric pressure, for 1 m$^2$ this volume corresponds to a thickness of 37 μm, that is, a thickness around twice less than the thickness of an ordinary sheet of paper.

The person skilled in the art will be able to calculate an adequate airgap for other reaction conditions.

In a particularly advantageous manner, this airgap e is therefore so small that it is ensured by the natural defects of planeity of the heating roller 4 and/or by the roughness and the porosity of the substrate when the latter is porous.

Optionally, it is possible for the heating roller 4 to be rougher to increase the airgap.

In particular, when the substrate is not porous or has a very closed surface, it is the heating roller which must have roughness adapted to obtain the necessary airgap.

The person skilled in the art could therefore be encouraged to use rollers having different degrees of roughness according to application.

For example, anilox rollers are available commercially with surface roughness volumes of the order of magnitude mentioned hereinabove.

It should be noted that the airgap does not necessarily have to be constant; there can be zones of the roller in contact with the substrate as much as in other zones there is sufficient distance between the substrate and the roller to obtain sufficient volume to dissipate the HCl. The airgap value indicated hereinabove is therefore an average value.

In this way, the volume between the surface of the heating roller and the substrate, that is, the volume defined by the airgap e and the contact distance l between the substrate S and the heating roller 4, constitutes the chromatogenous reaction chamber.

The fact that the chromatogenous reaction needs a low grafting rate allows using a small quantity of grafting reagent and consequently needs only a small volume for dissipation of the hydrochloric acid.

It is understood therefore that selecting the diameter, temperature and rotation speed of the heating roller 4 appropriately can ensure that when the substrate leaves the contact of the heating roller, the preferred advancement of the grafting reaction is achieved.

In other terms, it is ensured that the duration of contact of the substrate S with the heating roller 4 is substantially equal to the duration of the grafting reaction.

In the present text "substantially equal duration" means the duration in terms of which 90% or more of the grafting reaction is realised.

In addition, the development of the reaction is used with a minimal gas rate.

Also, the fact that the hydroxylated face Fh impregnated with the reagent is in contact with the roller optimises the thermal contribution, since only the face on which the reaction occurs is heated.

On the contrary, heating by infrared such as mentioned in the article by E. de Paola et al. cited earlier would penetrate the thickness of the substrate, resulting in much higher energy consumption and, in the case of an infrared gas system, in production of water vapour near the reaction, which would substantially jeopardise yield.

Also, the heating roller 4 can be used to carry out the reaction at a temperature greater than the optimal temperature determined in the process of the prior art.

According to the Arrhenius law, a rise in temperature by 30° C. in general leads to an increase in the reaction speed by a factor of 10, which corresponds to the preferred acceleration.

Therefore, for example, whereas the optimal temperature for grafting stearic acid is 150° C. in the conditions of the prior art, development of the reaction can be implemented according to the invention with a heating roller of 1.5 m in diameter, brought to a temperature of 170° C., with a scrolling speed of 400 m/min and by obtaining a grafting rate of 0.5 g/m$^2$.

In this respect, one might have feared, in the case where the substrate is coated by a film of PVA, that the latter—which is thermoplastic polymer—might melt in contact with the heating roller.

It was nevertheless noted that this was not the case.

A first cause seems to be the fact that the reagent deposited on the substrate forms a thin barrier which prevents adhesion of the PVA to the heating roller 4 early in the grafting reaction.

A second cause is that, when the PVA is grafted, it loses its adhesive character and is therefore no longer likely to adhere to the roller.

If necessary, it is possible to use the variant of the machine illustrated in FIG. 2 by heating the first roller 4' to a temperature lower than the melting temperature to further prevent parasite adhesion phenomena.

When the substrate S leaves contact with the roller 4, the HCl is aspirated by the aspiration device 6 for the purpose of both favouring the reaction kinetics and also minimising damage of the substrate by this corrosive gas.

However, even if the HCl remains between the substrate and the roller during reaction, so as to be removed at the outlet of the roller only, the reaction time obtained due to the invention is sufficiently short for the HCl not to have time to noticeably damage the substrate.

In the case of FIG. 2, the two heating rollers 4' and 4" can have different diameters and be heated to different temperatures, which allows controlling the reaction more accurately.

For example, when a larger quantity of reagent is necessary for a given application, using two rollers (or more) develops the reaction in a sufficiently short time.

In particular, the HCl released by the reaction at the outlet of each heating roller can be eliminated by a respective aspiration device 6', 6", which both minimises even more any degradation of the substrate by the HCl and also further accelerates the reaction by diminishing the second term of the speed equation.

This variant is particularly advantageous in the case of fragile substrates with large quantities of reagents and when high travel speeds are required.

Next, prior to rewinding of the treated substrate, the treated face of the substrate is swept by means of an air knife.

In fact, the effect of applying a hot air knife is dispersal of the unused reagent.

This is therefore physical and non-chemical cleaning of the substrate.

This elimination step of excess reagent has two advantages.

The first is rewinding the substrate devoid of reagent; in effect, the residual presence of reagent on the wound substrate would result long term in freeing HCl which, unable to escape, could degrade the substrate.

The second advantage is contributing to acceleration of the reaction by not having to wait for total consumption of the reagents.

The speed equation in fact shows that the speed is a function of the product of concentrations, which means that the lower the latter, the slower the reaction.

In other words, when the end of reaction is near the speed diminishes proportionally to the quantity of reagent still present.

This drop in speed would therefore be detrimental to obtaining a very short reaction time while quantities in play at this stage are very low and have minimal influence on the final result of treatment.

It has been verified in fact that the results in terms of barrier function are only minimally affected by a reduction of 5% to 10% of the quantity of reagent, for example.

Consequently, eliminating the residual 5% to 10% of reagent fails to substantially modify the functional properties of the substrate treated.

It should be noted that elimination of excess reagent by a hot air knife counter-current to the direction of travel of the substrate corresponds to the inverse conditions of those used to boost the reaction kinetics.

In fact, to eliminate the reagent it is necessary to strongly increase the diffusion phenomena, instead of restraining them.

A higher temperature (over the optimal temperature of the chromatogenous reaction), and above all a higher gas rate, achieve the expected result.

In the present text "hot air knife" therefore means an air knife whereof the temperature is greater than the temperature of the substrate, and preferably substantially greater than said temperature.

So, for example an air knife at 200° C. flowing at a linear speed of 30 m/s ensures the preferred cleaning.

Finally, the treated substrate is conventionally wound up in the form of a roll for storage, transport and/or later use.

The process which has just been described is particularly well adapted to the treatment of a substrate having high porosity and/or a low rate of humidity.

When a thick substrate is being treated, having low porosity, coated with an occlusive coating and/or having a high humidity rate, it can be difficult with the process which has just been described to eliminate all the water which has formed during reaction.

Inadequate grafting rate of the reagent, and/or hydrolysis of the latter can result.

An increase in the airgap and/or an increase in the temperature of the heating roller can to some extent improve the reaction efficacy and better remove water which has formed.

However, these solutions have their limits.

For example, an excessive increase in the airgap would result in forming a thermally insulating air space between the heating roller and the treated face of the substrate, and would not heat the substrate to the required temperature.

To treat a thick substrate, of low porosity and/or having an occlusive coating, another embodiment of the process using the machine illustrated in FIG. 3 is more advantageous.

In this embodiment, it is the face opposite the hydroxylated face Fh of the substrate which is in contact with the heating roller 4.

The hydroxylated face Fh is as such oriented towards the concave surface 41 of the fairing device 40 and is swept by the hot air knife (shown by dotted arrows) applied by the device 7.

The effect of this hot air knife, combined with the heating roller 4, is to obtain heating of the substrate on both its faces.

So, even if the substrate is thick and the heating roller cannot bring the hydroxylated face to the preferred temperature, the hot air knife contributes to increasing the temperature of the hydroxylated face to a temperature favouring grafting.

On the other hand, the hot air knife also fulfils the same function as in the first embodiment, that is, it carries away the reagent residue but also the hydrochloric acid and the water which have formed during reaction.

These products are aspirated by the extraction system which in this embodiment is arranged upstream of the heating roller, diametrically opposed to the application device of the air knife.

Also, it is the heating roller 4 which produces a support surface for the substrate against the pressure exerted by the hot air knife.

To ensure that the reagent can be grafted at a satisfactory yield onto the substrate prior to being swept by the hot air knife, the fatty acid fraction is dosed, having reacted with the hydroxyl groups of the over-treated face and the scrolling speed is adapted—and therefore the reaction duration—to optimise this value.

Finally, the energy balance of the process is improved since the hot air knife is not dissipated in the environment after having swept the surface of the substrate but is used to heat the substrate, allow development of the chromatogenous reaction and favour extraction of water and hydrochloric acid.

Example of Dimensioning of the Machine and Parametering of the Process

Purely by way of indication, a machine such as described hereinabove in reference to FIG. 1 can be dimensioned, and the process can be parametered, as follows.

The substrate to be treated is in the form of a roll of 1200 m in diameter and 240 mm in width.

The substrate is cellulosic material having gram weight between 30 and 400 g/m².

The scrolling speed is between 50 and 400 m/min.

The grafting reagent is a fatty acid chloride, deposited by flexography onto the hydroxylated face of the substrate, by being kept at a temperature greater than its melting temperature during its path to the substrate.

For example, in the case of stearic acid chloride, its melting point is 25° and it must therefore be brought to at least 40° C. for its application to the substrate.

The quantity of reagent deposited is between 0.2 and 2 ml/m².

Before and/or after deposit of the reagent, the substrate is optionally heated by infrared, as a function of the state of the substrate to be treated, the temperature of the grafting reagent and/or the distance to travel between the application device of the grafting reagent and the development heating roller.

The heating roller intended for development of the reaction has a diameter of 1.5 m and is brought to a temperature of 180° C. by means of a double-envelope structure fed with hot oil.

The reaction time is typically less than 1 second.

The extraction of the HCl at the outlet of the roller is done by means of an extractor hood.

The residual grafting reagent is eliminated via an air knife brought to 200° C., with a rate corresponding to a linear speed of 30 m/s, produced by a nozzle extending over the entire width and inclined by 45° relative to the substrate.

The substrate is preferably cooled before the winding of the substrate.

Finally, it is understood that the examples just given are only particular non-limiting illustrations in terms of the fields of application of the invention.

The invention claimed is:

1. A machine for chromatogenous grafting treatment of a scrolling cellulosic material substrate having a hydroxylated face, wherein the substrate is paper or cardboard, comprising:
   a winder for unwinding the cellulosic material substrate,
   an application device of a grafting reagent on the hydroxylated face of the substrate,
   wherein the application device of a grafting reagent is configured to deposit a quantity of reagent of between 0.2 and 2 ml/m² onto the substrate,
   a heating roller for development of a grafting reaction on the hydroxylated face of the substrate, said roller being provided with a bar-end system for applying a face of the substrate against said heating roller,
   wherein the heating roller is heated to greater than 150° C.,
   wherein the application device and the heating roller are arranged so as the hydroxylated face of the substrate is applied against the heating roller and the surface of the heating roller is provided with roughness to obtain an airgap between the roller and the substrate,
   an extraction device of the hydrochloric acid produced during the grafting reaction,
   an application device of a hot air knife, having a temperature higher than the temperature of the substrate, on the substrate for eliminating residual grafting reagent,
   wherein the application device of the hot air knife is a nozzle inclined at an angle greater than 30° relative to a surface of the substrate and oriented counter-current to a direction of travel of the substrate and applies pressure against the heating roller,
   a rewinding device of the treated substrate, and
   wherein the machine is suitable for use with the paper or the cardboard substrate.

2. The machine of claim 1, comprising at least two successive heating rollers and respective bar-end systems for applying the hydroxylated face of the substrate against said heating rollers for the development of the grafting reaction.

3. The machine of claim 1, wherein the application device of the grafting reagent is a flexography or heliography device.

4. A treatment process via chromatogenous grafting of a scrolling cellulosic material substrate comprising a hydroxylated face, wherein the substrate is paper or cardboard, comprising the following steps:
   (a) application to the hydroxylated face of the cellulosic material substrate of a grafting reagent,
   wherein the grafting reagent is deposited at a quantity of between 0.2 and 2 ml/m² onto the substrate,
   (b) development of the grafting reaction, one face of the substrate being applied against a heating roller,
   wherein the heating roller is heated to greater than 150° C.,
   wherein a diameter, a temperature and a rotation speed of the heating roller are selected such that a duration of contact of the substrate with the heating roller is a duration that at least 90% of the grafting reaction is complete,
   (c) extraction of the hydrochloric acid emitted during the grafting reaction.

5. The process of claim 4, wherein for the development of the grafting reaction, the hydroxylated face of the substrate is applied against said heating roller with an airgap adapted to confine the grafting reagent between the roller and the substrate and to allow dissipation of the hydrochloric acid emitted during the grafting reaction.

6. The process of claim 5, wherein the hydrochloric acid is extracted when the substrate leaves the contact of the heating roller.

7. The process of claim 5, wherein the development step (b) of the reaction is conducted by application of the hydroxylated face of the substrate against at least two successive rollers and in that the extraction step (c) of the hydrochloric acid is conducted when the substrate leaves the contact of each of said rollers.

8. The process of claim 5, wherein the roughness of the surface of the heating roller is selected so as to obtain between the substrate and the heating roller an airgap adapted to contain the hydrochloric acid emitted by the chromatogenous reaction.

9. The process of claim 8, wherein the airgap is on average between 0 and 100 μm.

10. The process of claim 4, wherein for the development of the grafting reaction, the face opposite the hydroxylated face of the substrate is applied against the heating roller.

11. The process of claim 10, wherein the hydrochloric acid and the residual grafting reagent are extracted upstream of the heating roller.

12. The process of claim 4, wherein the temperature of the hot air knife is greater than the temperature of the hydroxylated face of the substrate during the grafting reaction.

13. The process of claim 4, wherein the application step (a) of the reagent on the hydroxylated face of the substrate is conducted by flexography or by heliography.

14. The process of claim 4, wherein one face of the substrate is coated with a film of polyvinyl alcohol and the grafting reagent comprises stearic acid chloride or palmitic acid chloride.

15. The process of claim 4, wherein one face of the substrate is coated with a film of polyvinyl alcohol that comprises the hydroxylated face.

16. The process of claim 4 further comprising a step (d) of dispersing residual grafting reagent by application of a hot air knife, having a temperature higher than a temperature of the substrate, on the substrate.

17. The process of claim 16, wherein the hot air knife is inclined at an angle greater than 30° relative to a surface of the substrate and oriented counter-current to a direction of travel of the substrate.

18. A machine for chromatogenous grafting treatment of a scrolling cellulosic material substrate having a hydroxylated face, comprising:
   a winder for unwinding the cellulosic material substrate,
   an application device of a grafting reagent on the hydroxylated face of the substrate, wherein the application device of a grafting reagent is configured to deposit a quantity of reagent of between 0.2 and 2 ml/m² onto the substrate, a heating roller for development of a grafting reaction on the hydroxylated face of the substrate, said roller being provided with a bar-end system for applying a face of the substrate against said heating roller, wherein the heating roller is heated to greater than 150° C., wherein the application device and the heating roller are arranged so as the hydroxylated face of the substrate is applied against the heating roller and the surface of the heating roller is provided with roughness to obtain an airgap between the roller and the substrate, an extraction device of the hydrochloric acid produced during the grafting reaction, and a rewinding device of the treated substrate.

19. The machine of claim 18, further comprising an application device of a hot air knife, having a temperature higher than the temperature of the substrate, on the substrate for eliminating residual grafting reagent.

* * * * *